(12) United States Patent
Chang et al.

(10) Patent No.: US 11,450,143 B2
(45) Date of Patent: Sep. 20, 2022

(54) REAL/FAKE FINGERPRINT RECOGNITION DEVICE, METHOD, AND NON-TRANSITORY COMPUTER READABLE STORAGE MEDIUM

(71) Applicant: AU Optronics Corporation, Hsin-Chu (TW)

(72) Inventors: Po-Chao Chang, Hsin-Chu (TW);
Ruei-Pei Chen, Hsin-Chu (TW);
Chao-Chien Chiu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 17/115,845

(22) Filed: Dec. 9, 2020

(65) Prior Publication Data
US 2021/0248350 A1    Aug. 12, 2021

(30) Foreign Application Priority Data
Feb. 11, 2020    (TW) .................................. 109104188

(51) Int. Cl.
*G06V 40/40* (2022.01)
*G06T 5/00* (2006.01)
*G06V 40/12* (2022.01)

(52) U.S. Cl.
CPC .......... *G06V 40/1388* (2022.01); *G06T 5/009* (2013.01); *G06V 40/1347* (2022.01); *G06V 40/1365* (2022.01); *G06T 2207/30196* (2013.01)

(58) Field of Classification Search
CPC ........... G06K 9/00107; G06K 9/00013; G06K 9/00067; G06K 9/00087; G06T 5/009; G06T 2207/30196
See application file for complete search history.

(56) References Cited

U.S. PATENT DOCUMENTS

| | | | |
|---|---|---|---|
| 2015/0205992 A1* | 7/2015 | Rowe ................. | G06V 40/1324 382/124 |
| 2017/0109560 A1* | 4/2017 | Chen ...................... | G06K 9/001 |
| 2017/0220836 A1* | 8/2017 | Phillips .................... | G06K 9/52 |
| 2018/0060639 A1* | 3/2018 | Lee ..................... | G06K 9/00087 |
| 2019/0026527 A1* | 1/2019 | He ........................ | G06K 9/0004 |
| 2020/0394378 A1* | 12/2020 | Riehl ...................... | G06F 21/32 |
| 2021/0004562 A1* | 1/2021 | Chiang ............... | G06K 9/00906 |
| 2021/0073507 A1* | 3/2021 | Kim .................... | G06K 9/00114 |

FOREIGN PATENT DOCUMENTS

| | | |
|---|---|---|
| CN | 201716741 U | 1/2011 |
| CN | 102103685 A | 6/2011 |
| CN | 103544474 A | 1/2014 |
| TW | I530887 B | 4/2016 |

* cited by examiner

*Primary Examiner* — Lixi C Simpson
(74) *Attorney, Agent, or Firm* — WPAT, PC

(57) ABSTRACT

A real/fake fingerprint recognition device includes a light source, a detector, and a processor. The light source is configured to provide a first color light and a second color light to a fingerprint. The detector is configured to receive a first reflect light corresponding to the first color light, and receive a second reflect light corresponding to the second color light. The processor is configured to establish a first image and a second image according to the first reflect light and the second reflect light respectively, and determine whether the fingerprint is a real fingerprint according to the first image and the second image.

12 Claims, 6 Drawing Sheets

REAL/FAKE FINGERPRINT RECOGNITION DEVICE, METHOD, AND NON-TRANSITORY COMPUTER READABLE STORAGE MEDIUM

RELATED APPLICATIONS

This application claims priority to Taiwanese Application Serial Number 109104188 filed Feb. 11, 2020, which is herein incorporated by reference.

BACKGROUND

Technical Field

The present disclosure relates to a real/fake fingerprint recognition technology. More particularly, the present disclosure relates to a real/fake fingerprint recognition device, a real/fake fingerprint recognition method, and a non-transitory computer readable storage medium.

Description of Related Art

With developments of fingerprint recognition technology, fingerprint recognition technology has been applied to various fields. The fields are, for example, customs, various electrical devices, or other applications. However, the fingerprint may be counterfeited by some materials (for example, silica gel). For example, feature points and sweat glands of a real fingerprint may be counterfeited in a fake fingerprint, resulting in a fingerprint recognition device generating a fault recognition result.

SUMMARY

One embodiment of the present disclosure is related to a real/fake fingerprint recognition device. The real/fake fingerprint recognition device includes a light source, a detector, and a processor. The light source is configured to provide a first color light and a second color light to a fingerprint. The detector is configured to receive a first reflect light corresponding to the first color light, and receive a second reflect light corresponding to the second color light. The processor is configured to establish a first image and a second image according to the first reflect light and the second reflect light respectively, and determine whether the fingerprint is a real fingerprint according to the first image and the second image.

One embodiment of the present disclosure is related to a real/fake fingerprint recognition method. The real/fake fingerprint recognition method includes the following steps: providing a first color light and a second color light to a fingerprint by a light source; receiving a first reflect light corresponding to the first color light, and receiving a second reflect light corresponding to the second color light by a detector; establishing a first image and a second image according to the first reflect light and the second reflect light respectively by a processor; and determining whether the fingerprint is a real fingerprint according to the first image and the second image by the processor.

One embodiment of the present disclosure is related to a non-transitory computer readable storage medium. The non-transitory computer readable storage medium is configured to store one or more computer programs including a plurality of instructions. A processor is configured to execute the instructions. When the processor executes the instructions, operations are performed and the operations includes: providing a first color light and a second color light to a fingerprint; receiving a first reflect light corresponding to the first color light, and receiving a second reflect light corresponding to the second color light; establishing a first image and a second image according to the first reflect light and the second reflect light respectively; and determining whether the fingerprint is a real fingerprint according to the first image and the second image.

As the above embodiments, the real/fake fingerprint recognition device, the real/fake fingerprint recognition method, and the non-transitory computer readable storage medium of the present disclosure can recognize whether a fingerprint is a real fingerprint.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
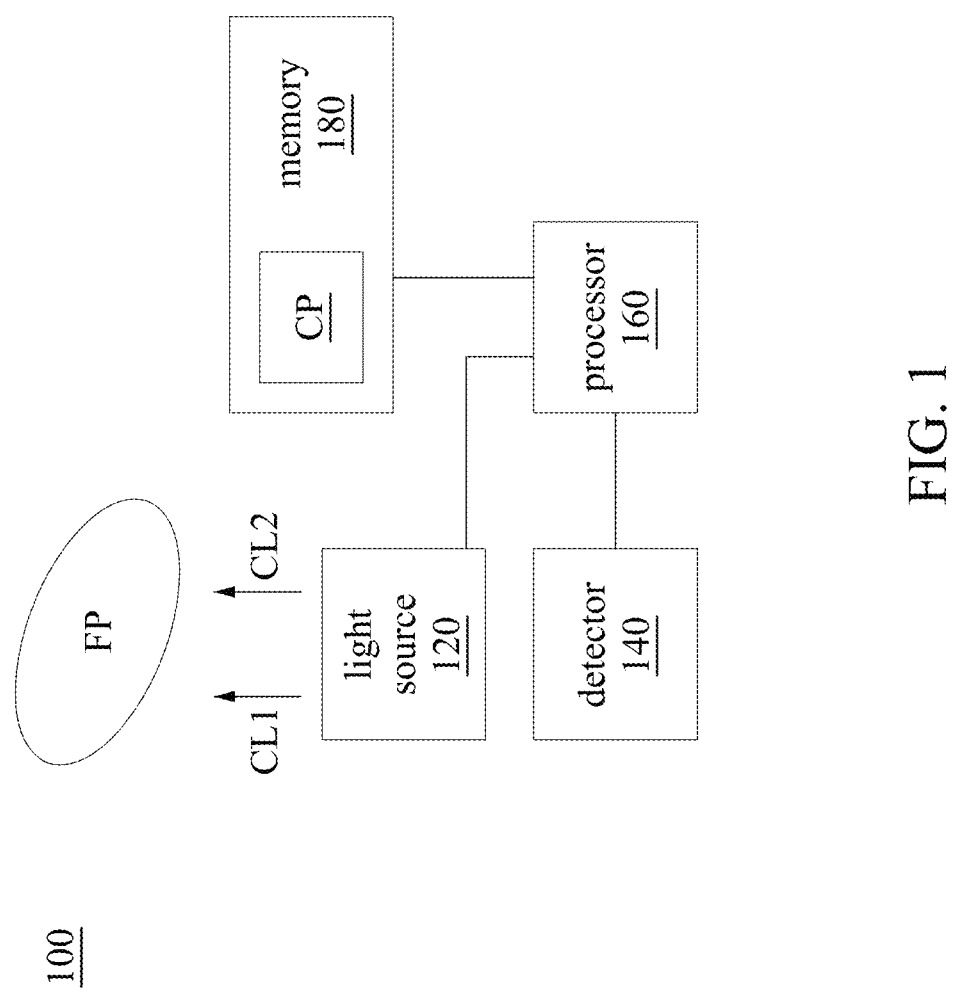
FIG. 1 is a schematic diagram illustrating a real/fake fingerprint recognition device according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

Various embodiments of the present technology are discussed in detail below with figures. It should be understood that the details should not limit the present disclosure. In other words, in some embodiments of the present disclosure, the details are not necessary. In addition, for simplification of figures, some known and commonly used structures and elements are illustrated simply in figures.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating a real/fake fingerprint recognition device 100 according to some embodiments of the present disclosure. As illustrated in FIG. 1, the real/fake fingerprint recognition device 100 includes a light source 120, a detector 140, a processor 160, and a memory 180. The processor 160 is coupled to the light source 120, the detector 140, and the memory 180.

In some embodiments, the light source 120 may be implemented by a backlight module, but the present disclosure is not limited thereto.

In some embodiments, the detector 140 may be implemented by multiple thin-film transistors and multiple detector elements, but the present disclosure is not limited thereto.

In some embodiments, the processor 160 may be implemented by a central processor unit (CPU) or a microprocessor, but the present disclosure is not limited thereto.

In some embodiments, the memory 180 may be implemented by non-transitory computer readable storage medium. The non-transitory computer readable storage medium is, for example, a ROM, a flash memory, a floppy disk, a hard disk, a compact disk, a flash disk, a pen driver, a magnetic tape, a data base read via a network, or other storage medium having the same function. The memory 180 is configured to store one or more computer programs CP including instructions, but the present disclosure is not limited thereto.

The configurations and implementations of the real/fake fingerprint recognition device 100 above are for illustrations, and various configurations and various implementations the real/fake fingerprint recognition device 100 are within the contemplated scopes of the present disclosure.

Figure 2:
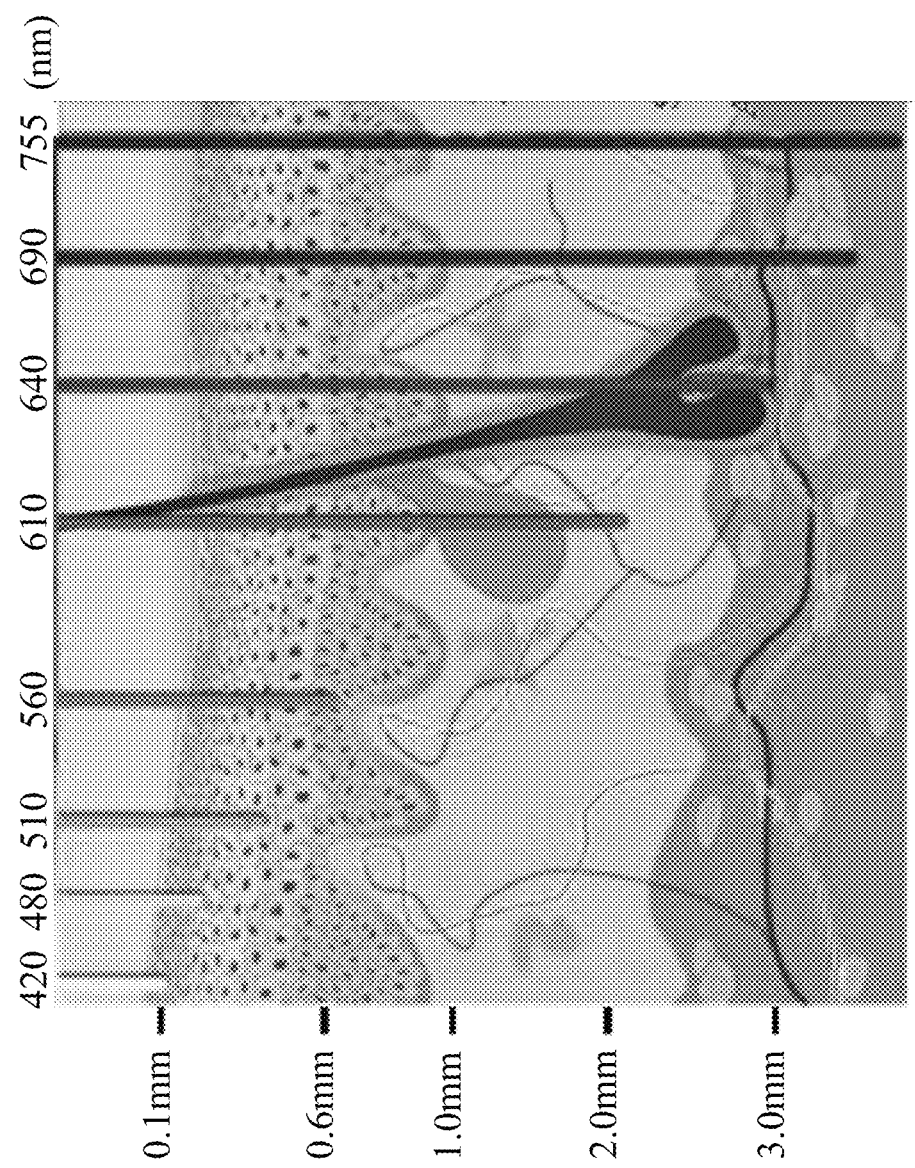
FIG. 2 is a schematic diagram illustrating different color light transmitting through a skin according to some embodiments of the present disclosure.

Reference is made to FIG. 2. FIG. 2 is a schematic diagram illustrating different color light transmitting through a skin according to some embodiments of the present disclosure. When a wavelength of a color light is shorter, a transmittance depth of the color light is shallower. On the contrary, when a wavelength of a color light is longer, a transmittance depth of the color light is deeper. Accordingly, the transmittance depth of the purple light (short wavelength) is shallowest in visible lights, and the transmittance depth of the red light (long wavelength) is deepest in visible lights.

Figure 3:
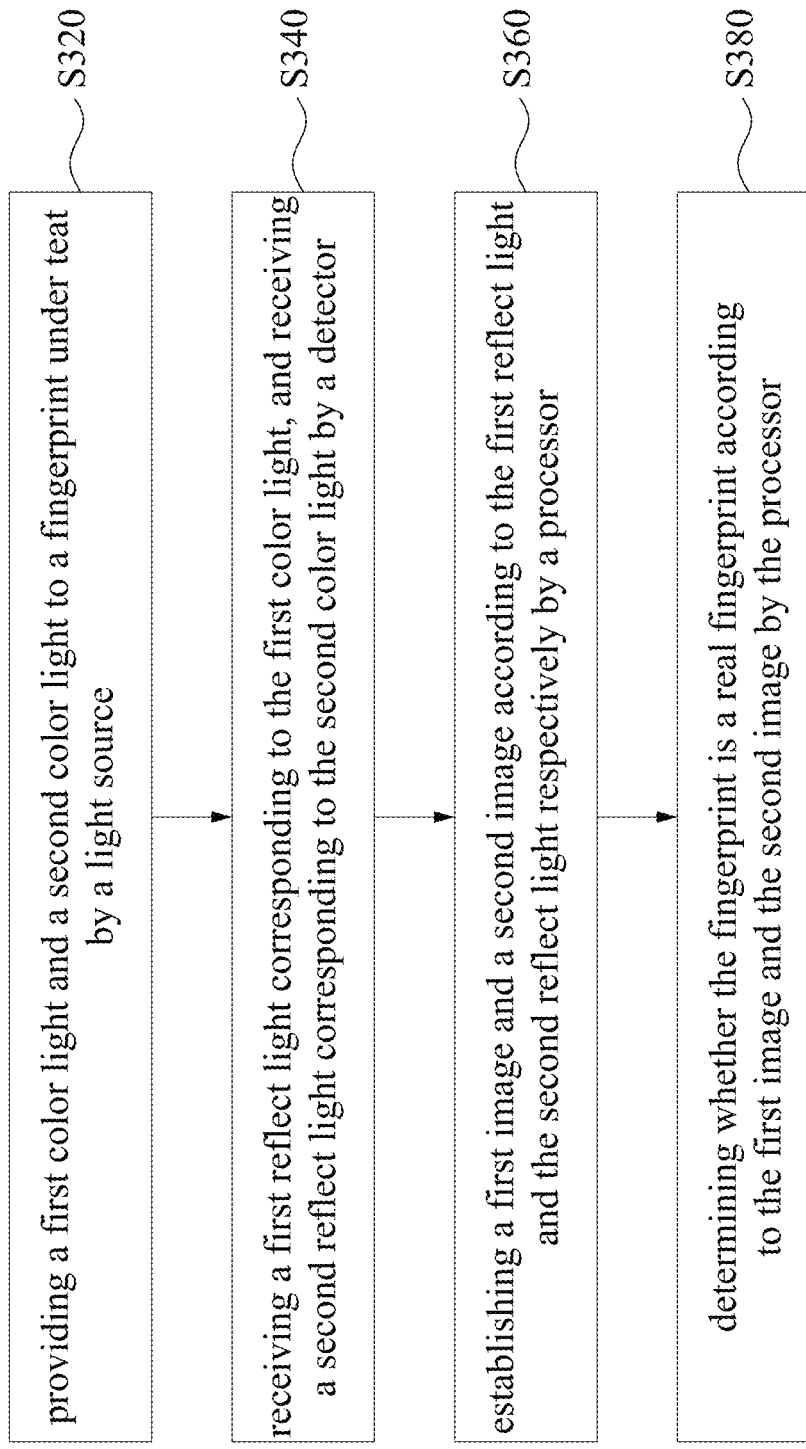
FIG. 3 is a flow diagram illustrating a real/fake fingerprint recognition method according to some embodiments of the present disclosure.

Reference is made to FIG. 3. FIG. 3 is a flow diagram illustrating a real/fake fingerprint recognition method 300 according to some embodiments of the present disclosure. As illustrated in FIG. 3, the real/fake fingerprint recognition method 300 includes operations S320, S340, S360, and S380.

In some embodiments, the real/fake fingerprint recognition method 300 is applied to the real/fake fingerprint recognition device 100 in FIG. 1, but the present disclosure is not limited thereto. For ease of understanding, the real/fake fingerprint recognition method 300 is described in following paragraphs with the real/fake fingerprint recognition device 100 in FIG. 1. In some embodiments, when the computer program CP is executed by the processor 160, a computer, or other electrical devices, the real/fake fingerprint recognition method 300 is performed.

In operation S320, the light source 120 provides color light CL1 and color light CL2 to a fingerprint-under-test FP. When the color light CL1 and the color light CL2 emits to the fingerprint-under-test FP, reflect light corresponding to the color light CL1 and reflect light corresponding to the color light CL2 are generated. In operation S340, the detector 140 receives the reflect light corresponding to the color light CL1 and the reflect light corresponding to the color light CL2. In operation S360, the processor 160 establishes two images according to the reflect light corresponding to the color light CL1 and the reflect light corresponding to the color light CL2 respectively. In operation S380, the processor 160 determines whether the fingerprint-under-test FP is a real fingerprint according to the two images.

The above description of the real/fake fingerprint recognition method 300 includes exemplary operations, but the operations of the real/fake fingerprint recognition method 300 are not necessarily performed in the order described. The order of the operations of the real/fake fingerprint recognition method 300 disclosed in the present disclosure are able to be changed, or the operations are able to be executed simultaneously or partially simultaneously as appropriate, in accordance with the spirit and scope of various embodiments of the present disclosure.

Figure 4:
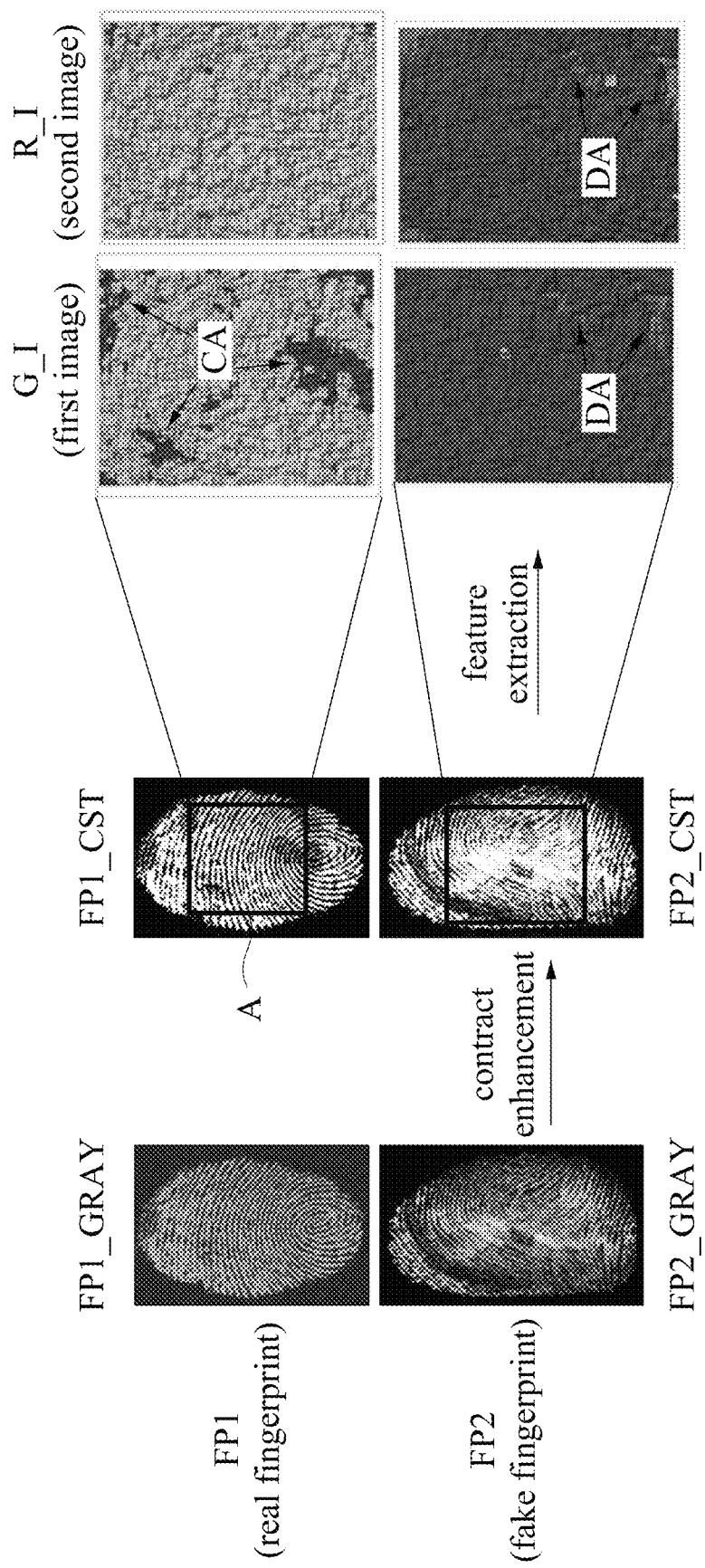
FIG. 4 is a schematic diagram illustrating some operations in FIG. 3 according to some embodiments of the present disclosure.

The operations of the real/fake fingerprint recognition method 300 are described with FIG. 4. FIG. 4 is a schematic diagram illustrating some operations in FIG. 3 according to some embodiments of the present disclosure. For ease of understanding, following paragraphs are described with FIG. 1-FIG. 4.

First, the light source 120 emits green light, blue light, or white light (as the color light CL1 in FIG. 1) to a fingerprint-under-test FP1 (or FP2). Since feature points and sweat glands can be counterfeited in a fake fingerprint, but blood vessels or red blood cells cannot be counterfeited in the fake fingerprint, and the transmittance depth of the green light in the visible light is easier to reflect blood vessels or red blood cells, color spots are generated by emitting the green light to the real fingerprint. In addition to the green light, the blue light and the write color light have the same characteristic. Alternatively stated, color light whose wavelength is shorter than 560 nm can be utilized to perform the real/fake fingerprint recognition. The green light (whose wavelength is shorter than the red light) is taken as an example to describe the following paragraphs.

The detector 140 receives the green reflect light corresponding to the green light. Then, the processor 160 establishes a gray-scale image FP1_GRAY (or FP2_GRAY) corresponding to the green light according to the green reflect light. Then, the processor 160 performs a contrast enhancement process on the gray-scale image FP1_GRAY (or FP2_GRAY) corresponding to the green light to generate a contrast enhanced image FP1_CST (or FP2_CST) corresponding to the green light. Then, the processor 160 performs a feature extraction process on the contrast enhanced image FP1_CST (or FP2_CST) corresponding to the green light, to establish a first image G_I, corresponding to the green light, of the fingerprint-under-test FP1 (or FP2).

The light source 120 emits the red light (as the color light CL2) to the fingerprint-under-test FP1 (or FP2). Similarly, the detector 140 receives red reflect light corresponding to the red light. Then, the processor 160 establishes a gray-scale image FP1_GRAY (or FP2_GRAY) corresponding to the red light according to the red reflect light. Then, the processor 160 performs a contrast enhancement process on the gray-scale image FP1_GRAY (or FP2_GRAY) corresponding to the red light to generate a contrast enhanced image FP1_CST (or FP2_CST) corresponding to the red light. Then, the processor 160 performs a feature extraction process on the contrast enhanced image FP1_CST (or FP2_CST) corresponding to the red light, to establish a second image R_I, corresponding to the red light, of the fingerprint-under-test FP1 (or FP2).

As illustrated in FIG. 4, the fingerprint-under-test FP1 is taken as an example. The first image G_I corresponding to the green light includes color spot areas CA, and the second image R_I does not include any color spot area. Accordingly, the processor 160 determines that the fingerprint-under-test FP1 is the real fingerprint.

The fingerprint-under-test FP2 is taken as an example, the first image G_I corresponding to the green light has defect areas DA (for example, defects generated when producing the silica gel fake fingerprint). Since the defects generated when producing the silica gel fake fingerprint cannot reflect any color light, the first image G_I corresponding to the green light and the second image R_I corresponding to the red light have the defect areas DA.

It is noted that, the system in some embodiments cannot identify that a region with different gray-scale is a color spot area CA or a defect area DA. Accordingly, based on the descriptions above, it can determine that the fingerprint FP is a real fingerprint or a fake fingerprint by determining whether the first image G_I is the same to the second image R_I. For example, if the first image G_I is different from the second R_I, it is determined that the fingerprint-under-test FP is the real fingerprint. If the first image G_I is the same to the second R_I, it is determined that the fingerprint-under-test FP is the fake fingerprint.

In some embodiments, if a fingerprint-under-test is a real fingerprint having stains (for example, marks of a marker pen) or wounds, the first image G_I corresponding to the green light has color spot areas CA (generated according to blood vessels or red blood cells) and defect areas DA (generated according to stains or wounds), and the second image R_I corresponding to the red light has the defect areas DA (generated according to stains or wounds). In other words, in this situation, the system can determine that the first image G_I is different from the second image R_I, to determine that the fingerprint FP is the real fingerprint.

Figure 5:
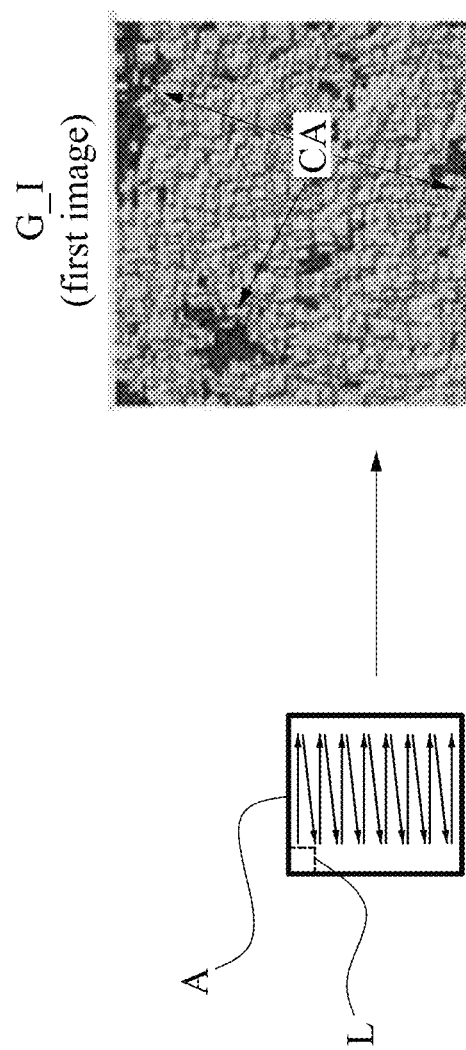
FIG. 5 is a schematic diagram illustrating a feature extraction process according to some embodiments of the present disclosure.

FIG. 5 is a schematic diagram illustrating a feature extraction process according to some embodiments of the present disclosure. In some embodiments, the feature extraction process utilizes a dynamic range (DR) technology. In other words, in these embodiments, the dynamic range technology is utilized to convert the contrast enhanced images FP1_CST and FP2_CST in FIG. 4 into the first image G_I and the second image R_I.

References are made to FIG. 4 and FIG. 5. The contrast enhanced images FP1_CST is taken as an example. A calculation region A is selected from the contrast enhanced images FP1_CST. Then, a pixel is selected from the calculation area A (for example, the pixel at the upper left corner in the calculation region A). Then, a target region L is selected based on the selected pixel (for example, the pixel at the upper left corner in the calculation region A). For simplicity of drawings and ease of understanding, FIG. 5 merely illustrates the calculation region A and the target region L, and the contrast enhanced images FP1_CST is omitted. For example, a length and a width of the target region L are 11 pixels. In other words, the target region L includes 121 pixels and covers the pixel (for example, the pixel at the upper left corner in the calculation region A). Then, 2% pixels having higher gray-scale values in the 121 pixels of the target region L are averaged, to generate a highest average gray-scale value. 2% pixels having lower gray-scale values in the 121 pixels of the target region L are averaged, to generate a lowest average gray-scale value. Then, the lowest average gray-scale value is subtracted from the highest average gray-scale value, to generate a dynamic range value of the pixel (for example, the pixel at the upper left corner in the calculation region A).

Then, a dynamic range value of another pixel in the calculation region A is calculated according to the operations above, and so on. After the operations above are performed on all pixels in the calculation region A, dynamic range values of the all pixels in the calculation region A are generated. Then, the first image G_I is generated according to the dynamic range values of the all pixels in the calculation region A. In other words, since the dynamic range values (about 40-50 gray-scale) in the color spot areas CA are different from the dynamic range values (about 70-80 gray-scale) in other portions of the fingerprint, image effect of the color spot areas CA in the first image G_I is different from image effect of the other portions of the fingerprint. Accordingly, the color spot areas CA are recognized.

Based on descriptions above, the contrast enhanced images FP2_CST in FIG. 4 can also be converted into the first image G_I, to recognize the defect areas DA. Since the color spot areas CA or the defect areas DA are recognized, the real/fake fingerprint recognition can be finished based on operation principles above.

Since operation principles of the second image R_I are similar to the operation principles of the first image G_I, so they are not described herein again.

The implementations of the feature extraction process above are for illustration, and various feature extraction processes are within the contemplated scopes of the present disclosure.

Figure 6:
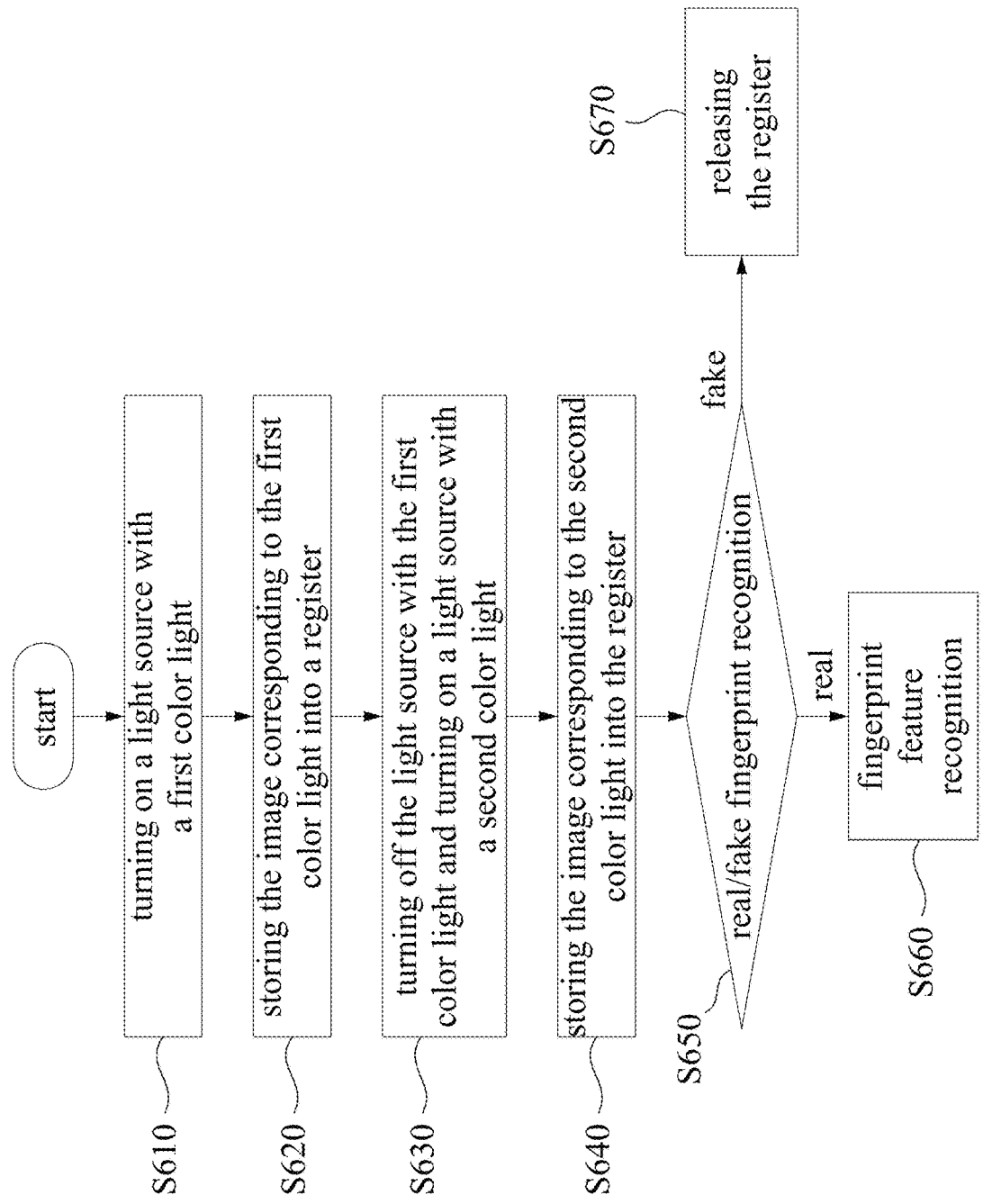
FIG. 6 is a flow diagram illustrating a fingerprint feature recognition method according to some embodiments of the present disclosure.

Reference is made to FIG. 6. FIG. 6 is a flow diagram illustrating a fingerprint feature recognition method 600 according to some embodiments of the present disclosure. As illustrated in FIG. 6, the fingerprint feature recognition method 600 includes operations S610, S620, S630, S640, S650, S660, and S670.

In some embodiments, the fingerprint feature recognition method 600 is applied to the real/fake fingerprint recognition device 100 in FIG. 1, but the present disclosure is not limited thereto. For ease of understanding, the fingerprint feature recognition method 600 is described with FIG. 1 and FIG. 4. In some embodiments, when the computer program CP is executed by the processor 160, a computer, or other electrical devices, the fingerprint feature recognition method 600 is performed.

In operation S610, a light source with a first color light (for example, the color light CL1) is opened. The color light CL1 is, for example, the green light, the blue light, or the white light. The green light is taken as an example, the gray-scale image FP1_GRAY corresponding to the green light is generated when the green light is emitted to the fingerprint-under-test FP1.

In operation S620, the gray-scale image FP1_GRAY corresponding to the green light is stored into a register.

In operation S630, the light source with the first color light is turned off and a light source with a second color light (for example, the color light CL2) is opened. The color light CL2 is, for example, the red light. The gray-scale image FP1_GRAY corresponding to the red light is generated when the red light is emitted to the fingerprint-under-test FP1.

In operation S640, the gray-scale image FP1_GRAY corresponding to the red light is stored into the register.

In operation S650, the real/fake fingerprint recognition process is performed. For example, the processor 160 performs the real/fake fingerprint recognition process according to the embodiments of the real/fake fingerprint recognition method 300 above. If the fingerprint-under-test FP1 is the real fingerprint, the fingerprint feature recognition method 600 goes to operation S660. If the fingerprint-under-test FP1 is the fake fingerprint, the fingerprint feature recognition method 600 goes to operation S670.

In operation S660, the fingerprint feature recognition process is performed. For example, when the processor 160 determines that the fingerprint-under-test FP1 is the real fingerprint, the processor 160 performs the fingerprint feature recognition process to recognize the user of the fingerprint-under-test FP1 (that is, the user who has the fingerprint FP1). Since related images are stored in the register before the real/fake fingerprint recognition process (operation S650) is performed. Accordingly, when the fingerprint feature recognition process is performed, the images can be read directly from the register for subsequent image processing or image recognitions. The image processing is, for example, thinning process, Fourier transform, or other image processing method. Thus, sensing time and image processing time can be saved. In addition, since there is no need to store the images again, storage spaces in the register can be saved.

In operation S670, the register is released. For example, if the fingerprint-under-test FP1 is recognized as a fake fingerprint, there is no need to determine who has the fingerprint. Accordingly, the images (for example, the gray-scale image FP1_GRAY corresponding to the green light, the gray-scale image FP1_GRAY corresponding to the red light) stored in the register can be erased directly, to release storage spaces of the register.

The above description of the fingerprint feature recognition method 600 includes exemplary operations, but the operations of the fingerprint feature recognition method 600 are not necessarily performed in the order described. The order of the operations of the fingerprint feature recognition method 600 disclosed in the present disclosure are able to be changed, or the operations are able to be executed simultaneously or partially simultaneously as appropriate, in accordance with the spirit and scope of various embodiments of the present disclosure. For example, in some other embodiments, the real/fake fingerprint recognition process in operation S650 and the fingerprint feature recognition process in operation S660 can be performed simultaneously. In other words, the processor 160 simultaneously determines whether the fingerprint-under-test FP1 is the real fingerprint and performs the fingerprint feature recognition process to recognize the user corresponding to the fingerprint-under-test FP1.

As the above embodiments, the real/fake fingerprint recognition device, the real/fake fingerprint recognition method, and the non-transitory computer readable storage medium of the present disclosure can recognize whether a fingerprint is a real fingerprint.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script in a form that is used for the layout or fabrication of the ultimate circuitry. Indeed, RTL is well known for its role and use in the facilitation of the design process of electronic and digital systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A real/fake fingerprint recognition device, comprising:
   a light source configured to provide a first color light and a second color light to a fingerprint;
   a detector configured to receive a first reflect light corresponding to the first color light, and receive a second reflect light corresponding to the second color light; and
   a processor configured to establish a first image and a second image according to the first reflect light and the second reflect light respectively, and determine whether the fingerprint is a real fingerprint according to the first image and the second image;
   wherein the processor determines that the fingerprint is the real fingerprint when the first image is different from the second image, and the processor determines that the fingerprint is a fake fingerprint when the first image is the same to the second image;
   wherein the first image comprises a plurality of color spot areas,
   wherein the processor is further configured to establish a first gray-scale image and a second gray-scale image according to the first reflect light and the second reflect light respectively, perform a contrast enhancement process on the first gray-scale image and the second gray-scale image to generate a first contrast enhanced image and a second contrast enhanced image respectively, and perform a feature extraction process on the first contrast enhanced image and the second contrast enhanced image to establish the first image and the second image respectively,
   wherein the processor performs the feature extraction process on the first contrast enhanced image and the second contrast enhanced image further comprising to select a target region according to a pixel from the first contrast enhanced image and the second contrast enhanced image respectively, to average a predefined percentage pixels having higher gray-scale values in the target region to generate a highest average gray-scale value, to average the predefined percentage pixels having lower gray-scale values in the target region to generate a lowest average gray-scale value, and to subtract the lowest average gray-scale value from the highest average gray-scale value to generate a dynamic range value of the pixel,
   wherein the dynamic range value is used to establish the first image and the second image respectively.

2. The real/fake fingerprint recognition device of claim 1, wherein the first color light is a green light, a blue light, or a white light, and the second color light is a red light.

3. The real/fake fingerprint recognition device of claim 1, wherein a wavelength of the first color light is shorter than a wavelength of the second color light.

4. The real/fake fingerprint recognition device of claim 1, wherein after the processor determines that the fingerprint is the real fingerprint, the processor performs a fingerprint feature recognition process to recognize a user corresponding to the fingerprint.

5. The real/fake fingerprint recognition device of claim 1, wherein the processor simultaneously determines whether the fingerprint is the real fingerprint and performs a fingerprint feature recognition process to recognize a user corresponding to the fingerprint.

6. A real/fake fingerprint recognition method, comprising:
providing a first color light and a second color light to a fingerprint by a light source;
receiving a first reflect light corresponding to the first color light, and receiving a second reflect light corresponding to the second color light by a detector;
establishing a first image and a second image according to the first reflect light and the second reflect light respectively by a processor, wherein the first image comprises a plurality of color spot areas;
determining whether the fingerprint is a real fingerprint according to the first image and the second image by the processor;
if the first image is different from the second image, determining that the fingerprint is the real fingerprint by the processor; and
if the first image is the same to the second image, determining that the fingerprint is a fake fingerprint by the processor,
wherein establishing the first image and the second image comprises:
establishing a first gray-scale image and a second gray-scale image according to the first reflect light and the second reflect light respectively by the processor;
performing a contrast enhancement process on the first gray-scale image and the second gray-scale image to generate a first contrast enhanced image and a second contrast enhanced image respectively by the processor; and
performing a feature extraction process on the first contrast enhanced image and the second contrast enhanced image to establish the first image and the second image respectively by the processor, wherein performing the feature extraction process on the first contrast enhanced image and the second contrast enhanced image further comprises to select a target region according to a pixel from the first contrast enhanced image and the second contrast enhanced image respectively, to average a predefined percentage pixels having higher gray-scale values in the target region to generate a highest average gray-scale value, to average the predefined percentage pixels having lower gray-scale values in the target region to generate a lowest average gray-scale value, and to subtract the lowest average gray-scale value from the highest average gray-scale value to generate a dynamic range value of the pixel,
wherein the dynamic range value is used to establish the first image and the second image respectively.

7. The real/fake fingerprint recognition method of claim 6, wherein the first color light is a green light, a blue light, or a white light, and the second color light is a red light.

8. The real/fake fingerprint recognition method of claim 6, wherein a wavelength of the first color light is shorter than a wavelength of the second color light.

9. The real/fake fingerprint recognition method of claim 6, further comprising:
performing a fingerprint feature recognition process to recognize a user corresponding to the fingerprint by the processor after the processor determines that the fingerprint is the real fingerprint.

10. The real/fake fingerprint recognition method of claim 6, further comprising:
simultaneously determining whether the fingerprint is the real fingerprint and performing a fingerprint feature recognition process to recognize a user corresponding to the fingerprint by the processor.

11. A non-transitory computer readable storage medium configured to store one or more computer programs comprising a plurality of instructions, wherein a processor is configured to execute the instructions, wherein when the processor executes the instructions, operations are performed and the operations comprises:
providing a first color light and a second color light to a fingerprint;
receiving a first reflect light corresponding to the first color light, and receiving a second reflect light corresponding to the second color light;
establishing a first image and a second image according to the first reflect light and the second reflect light respectively, wherein the first image comprises a plurality of color spot areas;
determining whether the fingerprint is a real fingerprint according to the first image and the second image;
if the first image is different from the second image, determining that the fingerprint is the real fingerprint; and
if the first image is the same to the second image, determining that the fingerprint is a fake fingerprint,
wherein establishing the first image and the second image comprises:
establishing a first gray-scale image and a second gray-scale image according to the first reflect light and the second reflect light respectively by the processor;
performing a contrast enhancement process on the first gray-scale image and the second gray-scale image to generate a first contrast enhanced image and a second contrast enhanced image respectively by the processor; and
performing a feature extraction process on the first contrast enhanced image and the second contrast enhanced image to establish the first image and the second image respectively by the processor, wherein performing the feature extraction process on the first contrast enhanced image and the second contrast enhanced image further comprises to select a target region according to a pixel from the first contrast enhanced image and the second contrast enhanced image respectively, to average a predefined percentage pixels having higher gray-scale values in the target region to generate a highest average gray-scale value, to average the predefined percentage pixels having lower gray-scale values in the target region to generate a lowest average gray-scale value, and to subtract the lowest average gray-scale value from the highest average gray-scale value to generate a dynamic range value of the pixel,
wherein the dynamic range value is used to establish the first image and the second image respectively.

12. The non-transitory computer readable storage medium of claim 11, wherein the first color light is a green light, a blue light, or a white light, and the second color light is a red light.

* * * * *